(No Model.)

W. BLANKNER.
COFFEE POT CONSTRUCTION.

No. 543,520.                              Patented July 30, 1895.

Witnesses:
H. B. Bradshaw
J. W. Bailey

Inventor.
William Blankner
By Staley and Shepherd
Attorneys

UNITED STATES PATENT OFFICE.

WILLIAM BLANKNER, OF AURORA, ILLINOIS.

COFFEE-POT CONSTRUCTION.

SPECIFICATION forming part of Letters Patent No. 543,520, dated July 30, 1895.

Application filed December 1, 1894. Serial No. 530,552. (No model.)

*To all whom it may concern:*

Be it known that I, WILLIAM BLANKNER, a citizen of the United States, residing at Aurora, in the State of Illinois, have invented a certain new and useful Improvement in Coffee-Pot Construction, of which the following is a specification.

My invention relates to the improvement of coffee pots or boilers, and the objects of my invention are to provide an ordinary form of coffee-pot with improved coffee holding and boiling compartments of such construction and arrangement as to facilitate the production of a good and clear coffee-liquid; to so arrange and construct the parts of my device as to retain the strength and flavor of the coffee, and to produce other improvements, which will be more fully pointed out hereinafter. These objects I accomplish in the manner illustrated in the accompanying drawings, in which—

Figure 1:
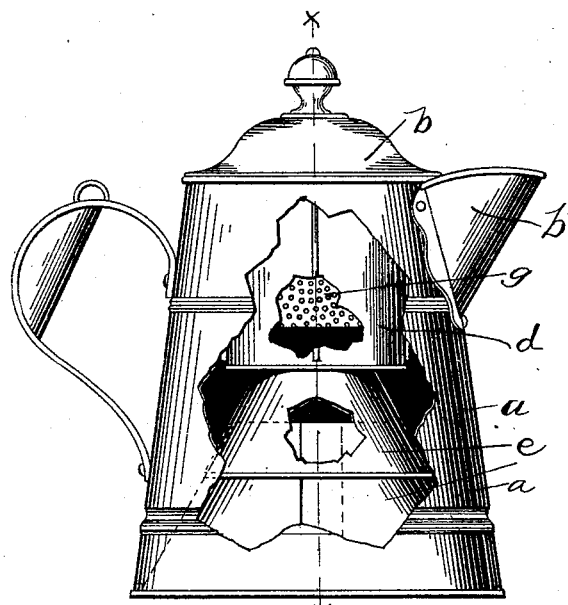
Figure 2:
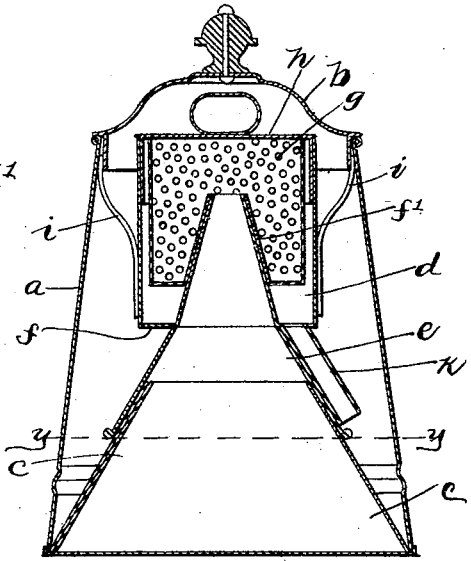
Figure 3:
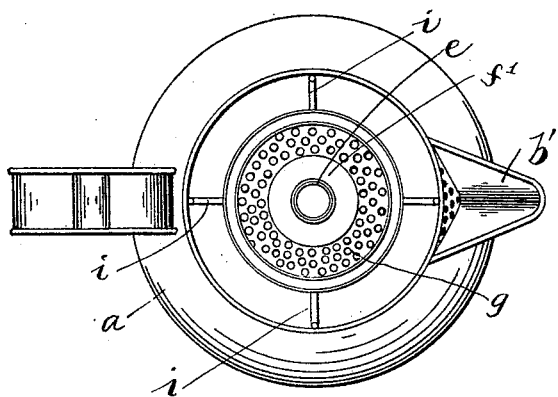
Figure 4:
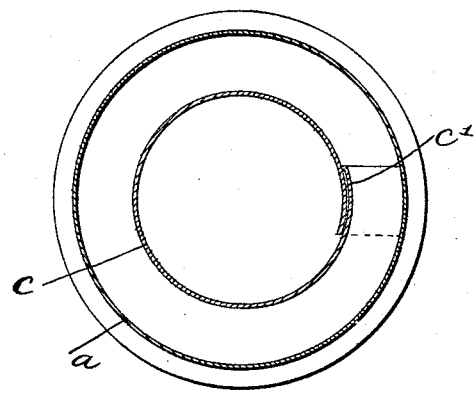

Figure 1 is a side elevation of my improved coffee-pot, showing portions of the outer and internal casings broken away. Fig. 2 is a central vertical section on line $x\ x$ of Fig. 1. Fig. 3 is a plan view with the coffee-pot lid and internal cup-lid removed, and Fig. 4 is a transverse section on line $y\ y$ of Fig. 2.

Similar letters refer to similar parts throughout the several views.

$a$ represents the external case or ordinary form of coffee-pot, the latter being provided with a suitable top lid $b$ and spout $b'$. Within the lower portion of the coffee-pot $a$, I cause to be seated a snugly-fitting conical band $c$, the latter preferably being formed of one strip of material which is coiled upon itself, as indicated at $c'$. The base of this band is designed, as shown, to fit snugly about the inner side of the coffee-pot bottom, while its upper and smaller end portion terminates at a point near the center of the height of the pot.

$d$ represents a short cylindrical body or casing, through the bottom of which extends upward the upper portion of a casing $e$, the latter being substantially in the form of an inverted funnel, as shown. The upper portion of the casing $e$ terminates, as shown, within the upper portion of the casing $d$, while the lower portion thereof projects beneath said case $d$ and has its flaring-mouth detachably seated over the upper end portion of the casing $c$.

As indicated at $f$, the lower end of the cup or casing $d$ is closed by an annular bottom ring which surrounds the central portion of the casing $e$.

$g$ represents a perforated cup-shaped body which may be formed of any suitable perforated or screen material. This cup-shaped screen or strainer body is provided with a central opening in its under side, from about which rises, as indicated at $f'$, a short tube or sheath having substantially the form of an inverted funnel, said sheath being adapted to fit snugly over the upper portion of the casing $e$, which is within the casing $d$. As indicated in the drawings, the perforated cup $g$ is of less circumference than the cup $d$ within which it is contained. The cup $d$ is adapted to be closed by a suitable cap-shaped lid $h$, which also forms, as shown, a cover for the perforated cup $g$.

In order to facilitate retaining the casing $d$ in its proper vertical position and in proper connection with the casing $c$, I provide on the outer side or periphery of said casing $d$, at suitable intervals, outwardly and upwardly projecting spring-fingers $i$, the latter being adapted to remain in spring-contact with the inner surface of the external casing $a$.

From the bottom ring $f$ of the cup $d$, I cause to lead downward into the space between the casings $c$ and $e$ and the external casing $a$ an outlet-spout $k$.

The manner of utilizing my improved coffee-pot is substantially as follows: The ground coffee to be used is placed within the perforated cup $g$ about its central conical sheath $f'$. The lids being closed, as shown in Fig. 2 of the drawings, the boiling water which is contained in the lower portion of the pot rises through the casings $c$ and $e$ and overflows onto the coffee contained in the casing $g$, passing downward through the bottom perforations of the casing $g$, and thence outward through the outlet-tube $k$. The liquid coffee thus produced is discharged into the main liquid-chamber, from which it may be poured out through the usual spout $b'$.

From the construction and operation which I have shown and described it will readily be seen that the ground coffee which is contained within the perforated cup $g$ is not subjected to the action of the water until the latter is in a boiling condition and that a mingling of the boiling water and coffee being attained, as above described, within the perforated cup, it is evident that a strong and good quality of coffee-liquid will be produced, which when the same escapes through the tube k will not carry with it the grounds which are contained within the cup. Owing to the fact that the ground coffee is not by the process herein described subjected to the prolonged boiling action and the strength thereof allowed to escape with the steam, it will be seen that the liquid coffee produced will have retained the strong coffee-flavor, thus resulting in the production of an increased quality of good liquid coffee from a comparatively small amount of ground coffee.

It will be observed that the construction and operation of my improved coffee-pot is exceedingly simple and inexpensive, and the ordinary form of coffee-pot may be readily provided with the means herein shown.

Having now fully described my invention, what I claim, and desire to secure by Letters Patent, is—

1. In a coffee pot construction the combination with the external coffee pot case a, of a cup or casing d suspended in the upper portion thereof, a funnel shaped casing projecting within said cup and depending therefrom as described, a perforated cup casing having a central conical sheath projecting therein and adapted to fit over the upper portion of said funnel shaped casing e, a spout leading from the casing d to the interior of the casing a and a lid h adapted to cover both the casings d and g, substantially as and for the purpose specified.

2. In a coffee-pot construction the combination with the external casing a, of a substantially cup shaped casing d suspended in the upper portion thereof, a funnel shaped casing partially within and partially without the case d as described, a perforated casing g contained within the casing d and having its bottom portion fitting about the upper portion of the casing e, an outlet spout k connecting the interior of the casing d with the interior of the casing a, a detachable lid covering both the casings d and g and a conical band c arranged as described in the lower portion of the external casing over which the lower portion of the casing e is adapted to fit, substantially as and for the purpose specified.

WILLIAM BLANKNER.

In presence of—
C. B. FISHER,
W. CUMINGS.